United States Patent [19]

Kitade

[11] Patent Number: 4,851,650
[45] Date of Patent: Jul. 25, 1989

[54] TRANSACTION PROCESSING APPARATUS HAVING A PLURALITY OF BANK ACCOUNT NUMBERS

[75] Inventor: Susumu Kitade, Nagaokakyo, Japan

[73] Assignee: Omron Tateisi Electronics Co., Kyoto, Japan

[21] Appl. No.: 745,085

[22] Filed: Jun. 17, 1985

[30] Foreign Application Priority Data

Jun. 15, 1984 [JP] Japan ................................. 59-124220

[51] Int. Cl.⁴ ......................... G06F 15/30; G06K 7/00
[52] U.S. Cl. .................................... 235/379; 235/380; 364/408; 902/22
[58] Field of Search ............ 235/379, 380, 382, 382.5; 340/825.33; 364/401, 406, 408; 902/4–5, 22, 27

[56] References Cited

U.S. PATENT DOCUMENTS

| 4,186,871 | 2/1980 | Anderson et al. | 235/380 |
| 4,314,352 | 2/1982 | Fought | 235/379 |
| 4,346,442 | 8/1982 | Musmanno | 364/408 |
| 4,485,300 | 11/1984 | Peirce | 235/379 |
| 4,594,663 | 6/1986 | Nagata et al. | 235/380 |
| 4,634,848 | 1/1987 | Shinohara et al. | 235/379 |

FOREIGN PATENT DOCUMENTS 0161077 9/1983 Japan ................................. 235/379

Primary Examiner—Alan Faber
Assistant Examiner—Robert A. Weinhardt
Attorney, Agent, or Firm—Foley & Lardner, Schwartz, Jeffery, Schwaab, Mack, Blumenthal & Evans

[57] ABSTRACT

A terminal unit for transaction processing, according to the present invention, is adapted to record information for identifying a plurality of banks in a credit card while storing priority of the banks in a bank priority file, for reading the information, for identifying the plurality of banks from the credit card by a card reader, and reading the priority from the bank priority file. On the basis of the read identification information, the present invention allows selecting one of the banks in order to enable a transaction with the selected bank.

6 Claims, 1 Drawing Sheet

TRANSACTION PROCESSING APPARATUS HAVING A PLURALITY OF BANK ACCOUNT NUMBERS

BACKGROUND OF THE INVENTION

1. Field of the Invention

The present invention relates to a terminal unit for transaction processing. More specifically, it relates to a terminal unit for transaction processing which can select an account for performing transaction processing.

2. Description of the Prior Art

Generally known in the art is a credit authorization terminal unit (hereinafter referred to as CAT) for performing transaction processing by employing credit cards. Such a CAT is distributed in each shop so that an attendant inserts a credit card submitted by a customer to purchase commodities in a card reader to read data on the customer recorded in the credit card and transmit the same to a host computer, which in turn determines whether or not the card is submitted by the person himself and checks the customer's balance at the bank so as to allow a credit transaction only when all of the conditions are normal. In general, one credit card stores only a set of account identification information formed by an identification number of the customer, a bank code number, a bank account number and the like. However, various types of credit cards are provided in recent years whereby one person has a plurality of cards, leading to complicacy in management.

Information on a plurality of bank accounts may be stored in a card having a plurality of, e.g., magnetic tracks in the future. In this case, each of shops in which the credit card is used has its own bank, and preferably the transaction is processed through the said bank if the customer has an account at the same bank. Thus, awaited is provision of a terminal unit for transaction processing which selects one from a plurality of bank accounts along priority in response to a requirement by the customer to perform transaction processing.

SUMMARY OF THE INVENTION

Accordingly, a principal object of the present invention is to provide a terminal unit for transaction processing which can select one from a plurality of accounts along priority thereby to perform transaction processing.

Briefly stated, the present invention provides a terminal unit for transaction processing which previously stores priority information on accounts to read a plurality of sets of account identification information from a recording medium and read priority information on the basis of the read account identification information thereby to select an account along the priority for performing transaction processing with the selected account.

Therefore, according to the present invention, transaction processing can be performed through a bank or a tie-up bank thereof selected from a plurality of banks at which a customer has accounts, thereby to reduce complicated processing such as transfer between banks and payment of commissions.

The above and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
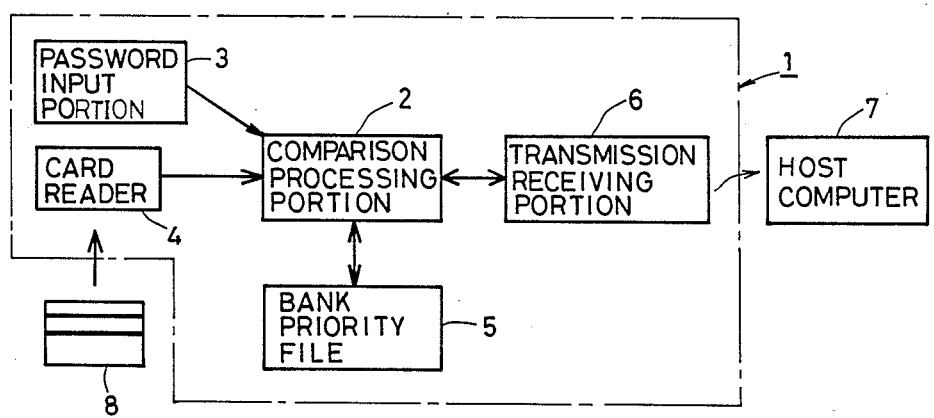
FIG. 1 is a schematic block diagram showing an embodiment of the present invention.

FIG. 1 is a schematic block diagram showing the structure of a terminal unit for transaction processing according to an embodiment of the present invention. Although the embodiment is described with respect to the case where the present invention is applied to a CAT, the present invention is also applicable to other types of transaction processing units such as an automatic teller machine, a cash dispenser and an electronic cash register.

In FIG. 1, a CAT 1 is provided with a CPU 2, a password input portion 3, a card reader 4, a bank priority file 5 and a transmission/receiving portion 6 etc. The CPU 2 is connected with the password input portion 3, card reader 4, bank priority file 5 and transmission/receiving portion 6. The CPU 2 controls operations of all these circuits. The password input portion 3 is so employed that a customer inputs his password. The card reader 4 is adapted to read data recorded on a credit card 8. A plurality of sets of account identification information are formed by the customer's identification number, bank code numbers, bank account numbers and the like. The bank priority file 5 stores information on priority of the banks previously determined for convenience of a shop. The transmission/receiving portion 6 is adapted to perform data transmission between the CPU 2 and host computer 7.

Figure 2:
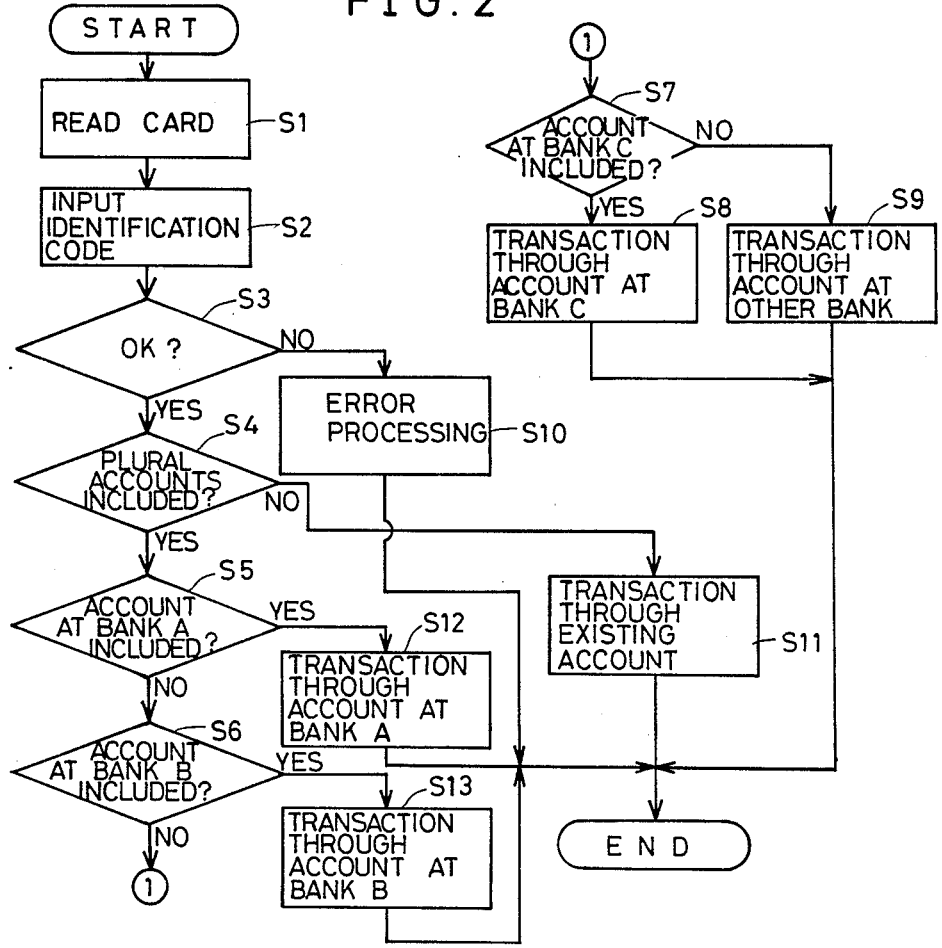
FIG. 2 is a flow chart for illustrating the definite operation of the embodiment of the present invention.

FIG. 2 is a flow chart for illustrating the definite operation of the present embodiment. As the bidirectional line between the comparison processing station 2 and bank priority file 5 in FIG. 1 illustrates, the account data used in the steps shown in the FIG. 2 flow chart are obtained from the bank priority file 5.

Referring to FIGS. 1 and 2, description is now made on the operation of the embodiment. It is assumed as an example that a customer purchases commodities by a credit card in a shop which mainly keeps balances with a bank A. As a result, the shop gives highest priority to bank A. Thus, if a customer has an available account at bank A, the shop will select bank A to process the transaction. It is further assumed that the shop determines the bank priority in the order of the bank A, a tie-up bank B and an allied bank C. Set in advance in the bank priority file 5 are, e.g., code numbers indicating the names of the banks.

On the other hand, it is assumed that a customer has accounts at the banks A and C, and information on the accounts is recorded in the credit card 8. In order to purchase commodities, the customer hands the credit card 8 to an attendant, who inserts the same in the card reader 4.

At a step S1, the CPU 2 makes the card reader 4 read the account identification information recorded in the credit card 8, i.e., the customer identification number, bank code numbers and bank account numbers etc. At a step S2, the customer inputs his password through the password input portion 3. The CPU 2 makes a determination as to coincidence of the password inputted through the password input portion 3 and that read from the credit card 8 by the card reader 4. When a determination is made that the password inputted through the password input portion 3 is not coincident with that read by the card reader 4, the CPU 2 performs error processing at a step S10, while advancing to a step S4 upon a determination on coincidence of the password.

At the step S4, the CPU 2 determines whether or not the information read by the card reader 4 includes a plurality of bank account numbers. When the read information includes only one bank account number there is no priority issue card, the CPU 2 advances to a step SP11 to perform transaction processing with the bank on the basis of the bank account number read from the credit card 8. In the present example, the account numbers of two banks are recorded in the customer's credit card 8, and hence the CPU 2 advances to a step S5.

At the step S5, the CPU 2 determines whether or not the information includes an account number of the bank A, since bank A is the shop's highest priority bank. If the determination is yes, the CPU 2 performs transaction processing in the account of the bank A at a step S12. At this time, the CPU 2 transmits and receives information to and from the host computer 7 through the transmission/receiving portion 6, thereby to perform the transmission processing. If the customer has no account at the bank A, the CPU 2 advances from the step SP5 to a step S6. At the step SP6, the CPU 2 determines whether or not an account number of the bank B is recorded in the credit card 8. Upon a determination of yes, the CPU 2 advances to a step S13 to perform transaction processing with the account of the bank B, since bank B is the shop's next priority bank. If no account of the bank B is recorded in the credit card 8, the CPU 2 advances to a step S7 to determine whether or not an account number of the bank C is recorded in the credit card 8. If the determination is yes, the CPU 2 advances to a step S8 to perform transaction processing with the account at third priority bank C. If no account at the bank, C is recorded in the credit card 8, the CPU 2 performs transaction processing with an account at other bank recorded in the credit card at a step S9, thereby to terminate the sequential operation. It should be noted that any number of priority banks can be selected.

According to the aforementioned embodiment, priority of banks is determined to store the priority information in the bank priority file 5 thereby to select a convenient one from a plurality of bank accounts read from the credit card 8 for performing transaction processing, whereby complicated processing such as transfer between banks and payment of commissions is decreased.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of transaction processing comprising the steps of:
    (a) recording in a first storage means a sequence of parameters indicating a predetermined priority among a first plurality of accounts for processing a transaction;
    (b) reading at least one corresponding parameter for an account from a second storage means;
    (c) if more than one account is read from said second storage means, comparing in an account selection means said account parameters read from the second storage means with said sequence of parameters in the first storage means and processing a transaction through a highest priority account determined by identifying a first parameter in said sequence of parameters matching a said parameter read from said second storage means.

2. The method of claim 1 comprising the step of selecting each of said parameters to be that part of an account number identifying a financial institution.

3. The method of claim 1 further comprising verifying validity of a user supplied password for the account information on the second storage means.

4. A terminal for transaction processing comprising:
    (a) means for recording in a first storage means a sequence of parameters indicating a predetermined priority among a first plurality of accounts for processing a transaction;
    (b) means for reading at least one corresponding parameter for an account from a second storage means;
    (c) means for comparing said account data read from the second storage means with said sequence of parameters in the first storage means when a plurality of account numbers is read from said second storage means and means for processing a transaction through a highest priority account determined by a means for identifying a first parameter in said sequence of parameters matching a said parameter read from said second storage means.

5. The terminal unit of claim 4 wherein each of said parameters is that part of an account number identifying a financial institution.

6. The terminal unit of claim 4 further comprising means for verifying validity of a user supplied password for the account information on the second storage means.

* * * * *